UNITED STATES PATENT OFFICE.

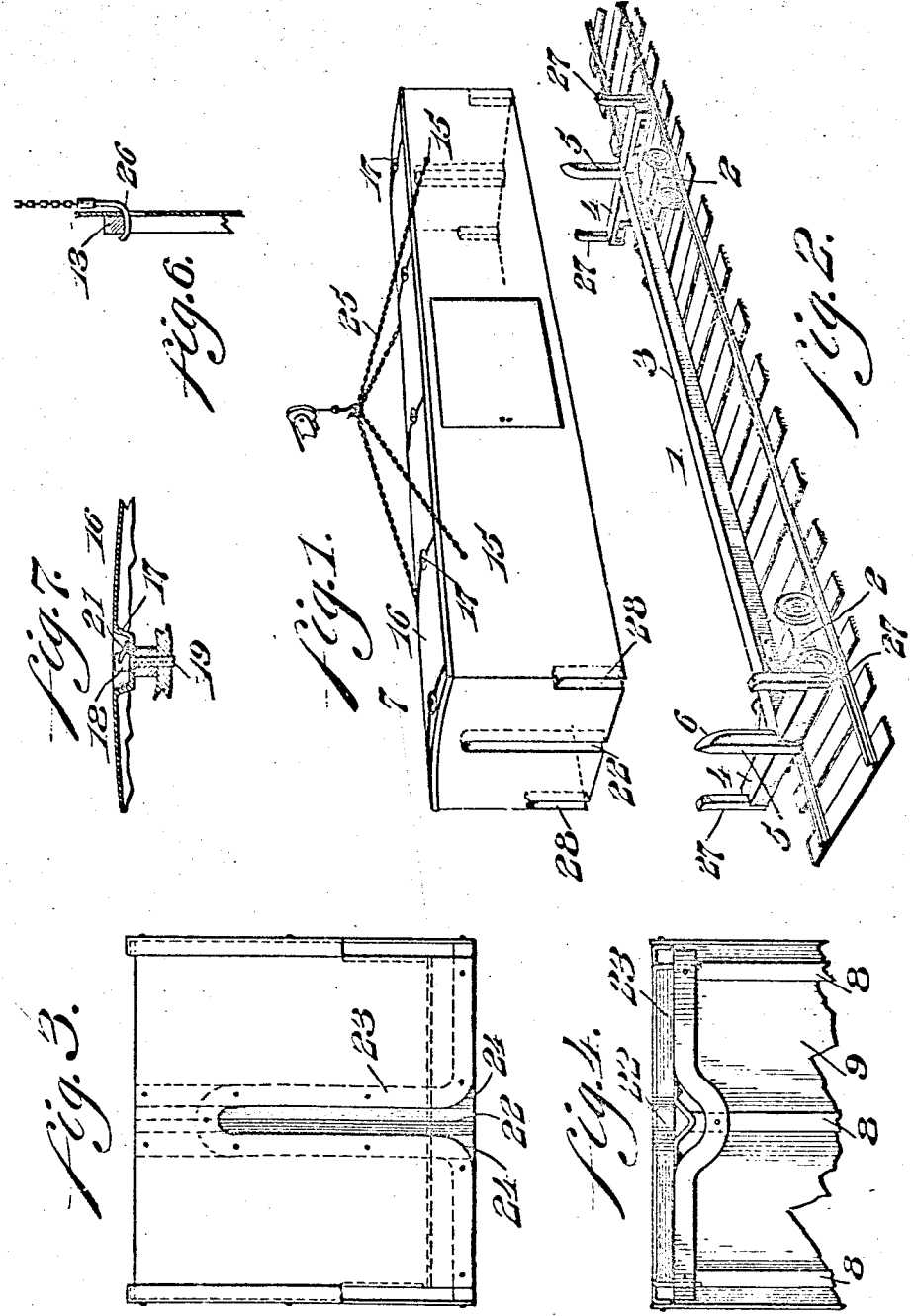

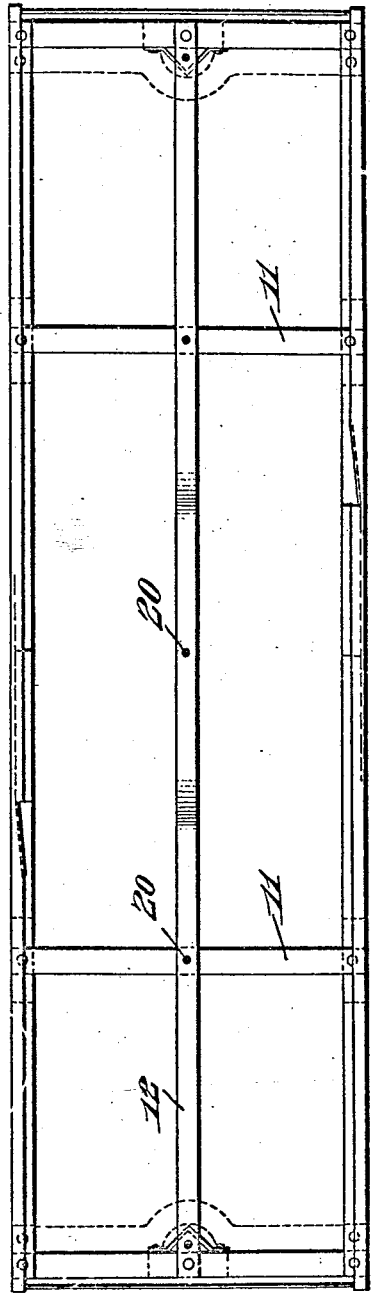
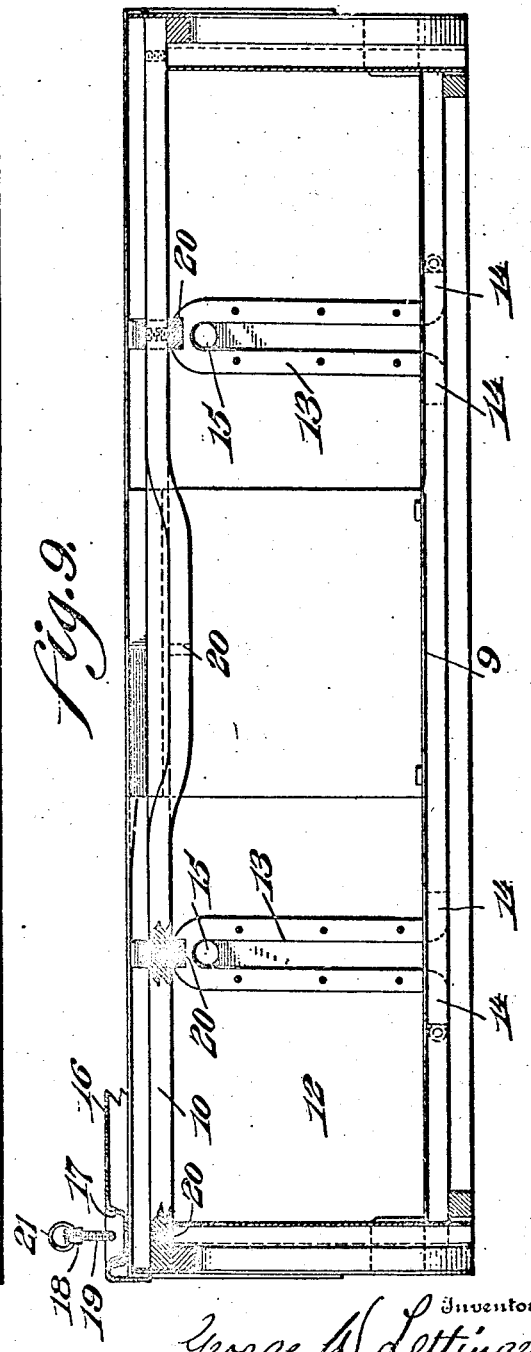

GEORGE W. LETTINGER, OF PHILADELPHIA, PENNSYLVANIA.

DETACHABLE BODY AND TRUCK FOR CARS.

No. 895,278.  Specification of Letters Patent.  Patented Aug. 4, 1908.

Application filed February 10, 1908. Serial No. 415,014.

*To all whom it may concern:*

Be it known that I, GEORGE W. LETTINGER, a citizen of the United States, residing at Philadelphia, county of Philadelphia, State of Pennsylvania, have invented a new and useful Detachable Body and Truck for Cars, of which the following is a specification.

My invention relates to a new and useful detachable body and truck or running gear for railroad cars and the like and consists of means whereby the car body is firmly and securely held in position while on the truck and can be elevated or removed therefrom as desired.

It further consists of other novel details of construction, all as will be hereinafter fully set forth.

Figure 1 represents a perspective view of a detachable body for cars showing the body in raised or elevated position. Fig. 2 represents a perspective view of a truck therefor. Fig. 3 represents an end elevation of the car body. Fig. 4 represents a plan view of a portion thereof. Fig. 5 represents a perspective view of one of the loop braces employed. Fig. 6 represents a sectional view on line $x-x$, Fig. 5, showing a hook in position. Fig. 7 represents a sectional view of a portion of the upper part or roof of a car. Fig. 8 represents a top plan view of a car body showing the roof removed. Fig. 9 represents a partial sectional view and partial elevation showing the interior of the car body.

Similar numerals of reference indicate corresponding parts in the figures.

Referring to the drawings. In railroad and other cars now in use it is, of course, impossible to remove the body from the trucks without destroying the car and in consequence when a car is not in use, it is obliged to lie idle upon the sidings or tracks of the roads which is an evident disadvantage. My invention is designed to overcome this and to provide means whereby a car can be changed from one form to another, for example, a box car can change to a flat car or to a coal car, and in addition it is so constructed that the car body can be easily removed from the trucks or running gear and can be stored at any convenient point adjacent the tracks. In addition owing to the shape of the car body, the same can be stacked one upon the other, thus providing means whereby a great number of car bodies can be stored in a comparatively small space. It further provides that if a full car is received and it is desired to empty the same, by removing the car body, it can be deposited at a suitable point while being emptied and another car body can be immediately placed upon the car trucks and the same utilized at once.

In the drawings I have shown a construction for carrying out my invention, but it will be evident that the arrangements of the parts will be varied and other instrumentalities may be employed which will come within the scope of my invention and I do not, therefore, desire to be limited in every instance, to the exact construction as herein shown and described, but desire to make such changes as may be necessary.

1 designates the running gear and frame of my improved car, the same consisting of the trucks 2 formed in any desired manner and connected by the beam or bar 3 to which the trucks are fastened in any suitable and desired manner. Extending from opposite ends of said beam 3 are the bars 4 which are securely fastened to said beam and strengthened in any desired manner. Extending upwardly from the beam 3 or from the bars 4 are the arms 5 which are formed in any desired manner, but preferably with the upper edge thereof being inclined or beveled as at 6.

7 designates the removable car body which is formed in any suitable or desired manner as far as the frame thereof is concerned and in the present instance, I have shown the bottom bars 8 extending from end to end of the car and carrying or supporting the bottom or flooring 9. The upper bars 10 extend suitably across the body, and are preferably strengthened by the cross-rods 11. At suitable points on the sides 12 of the car I secure, in any desired manner, the loop supports 13 which, in the present instance, have the offset feet 14 which pass beneath the flooring of the car so that a portion of the strain from the loops will be carried by the sides 12 and the bottom or flooring 9 of the car. In the sides of the car I preferably form the openings 15 adjacent the loop or bend of supports 13 for purposes to be hereinafter described.

The top 16 of the car is removably connected therewith and is formed substantially flat, as best seen in Fig. 1, only a sufficient curve being given thereto to provide for the drainage of the water, rain, etc. The roof is countersunk as at 17, at suitable points therein, which are adapted to receive the heads 18 of the bolts 19 which are adapted to pass through the roof 16 and to have threaded engagement with the openings 20 in the upper bars 10. In this way the roof will be firmly and positively attached to the car body while the heads 18 and rings 21 of the threaded bolts 19 do not project above the plane of the roof. In the end portions of the cars I provide the recesses 22, the walls of which are strengthened by the braces 23 which extend from the side edges of the car upwardly around the recess 22 as will be seen from Fig. 3, said braces being suitably connected or attached to the end bar of the car and the lower edges of which braces are curved as at 24 to provide for the proper positioning of the arms 5 which it will be understood are adapted to enter and be received in the recess 22, the inclined faces 6 on the arms assisting in its proper positioning of the bars. From the above it will be understood that when the car body 7 is located and placed upon the running gear and frame that the bars 5 will positively hold the car body in proper position on the running gear and that in order to remove the same it is only necessary to elevate the body 7 sufficiently to free it from the arms 5. The elevating or removing of the car bodies can be accomplished in any suitable manner and in the drawings I have shown a chain 25 having hooks 26 thereon which are passed through the opening 15 through the sides of the body, said hooks, it will of course be seen, passing beneath the loops of the braces 13. By connecting the chain with a proper hoist, the car can be easily elevated or, if more desirable, the hooks on the chain can be connected with the rings 21 on the bolts 19 for a similar purpose.

If necessary I may omit the arms 5 and provide the two end bars 27 which are adapted to enter recesses 28 formed at a suitable point in the ends of the car bodies, to receive the same, the effect of which is similar to that of the arms 5, or if necessary or desirable, I may employ the arms 5 and the uprights 27 jointly, the effect of which is the same as already described.

Having thus described my invention, what I claim as new and desire to secure by Letters Patent, is:—

1. In a device of the character described, running gear having a suitable skeleton frame, arms extending upwardly therefrom at each end thereof, and a car body having suitable recesses adapted to receive said arms.

2. In a device of the character described, running gear having a suitable frame connected therewith, an arm extending upwardly therefrom at each end thereof, a car body having suitable recesses at each end adapted to receive said arms, and braces at each end strengthening said recesses.

3. In a device of the character described, running gear, a frame connected therewith, arms extending upwardly therefrom, a car body having recesses at suitable points adapted to receive said arms, and side braces for said car body adjacent suitable openings which are adapted to receive means for elevating and lowering said car body.

4. In a device of the character described, running gear, a frame therefor, arms extending upwardly from said frame, a car body having suitable recesses therein adapted to receive said arms, a removable top for said car body, and means for connecting said top to said body and serving as a means or connection for elevating and lowering said car body.

5. In a device of the character described, running gear having a suitable frame connected therewith, an arm extending upwardly therefrom at each end thereof, a car body having suitable recesses at each end adapted to receive said arms and braces at each end strengthening said recesses and the lower portion thereof forming guides for directing the arms into said recesses.

6. In a device of the character described, running gear having a suitable frame connected therewith, an arm extending upwardly therefrom at each end thereof, a car body having suitable recesses at each end adapted to receive said arms, braces at each end strengthening said recesses and outwardly extending ends on said braces.

7. In a device of the character described, running gear, a frame therefor, arms extending upwardly from said frame, a car body having suitable recesses therein adapted to receive said arms, a removable top for said body, being counter-sunk at suitable points, means for connecting said top to said body and means thereon, seated in said counter-sunk portions serving as an engaging means or connection for elevating and lowering said car body.

GEORGE W. LETTINGER.

Witnesses:
C. D. McVay,
E. B. Morris.